3,159,606
FATTY ACID POLYAMIDE RESINS
Rex J. Sims and Thomas W. Findley, La Grange, and Berry O. Powell, Chicago, Ill., assignors to Swift & Company, Chicago, Ill., a corporation of Illinois
No Drawing. Filed Sept. 16, 1959, Ser. No. 840,256
7 Claims. (Cl. 260—78)

This invention relates to new polymeric products and, more particularly, to the manufacture of polyamide resins having unique properties.

It is an object of the invention to prepare new and useful polymeric products from N-aceylamido fatty acids.

Another object is the provision of a method whereby these polymeric products may be prepared.

Additional objects will be readily apparent to those skilled in the art from the detailed description which follows.

In general, the method of this invention involves the condensation polymerization in a nonoxidizing atmosphere of a monomer comprising an N-acylamido fatty acid of the structure

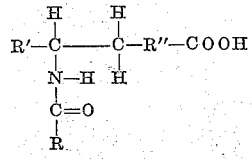

or the isomeric

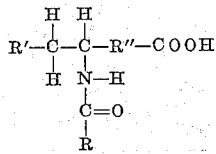

form and mixtures thereof. In this formula R is selected from H, alicylic, phenyl, substituted phenyl, phenyl alkyl, and monovalent alkyl radicals having 1–17 carbons, R' is H or a monovalent alkylene radical having 1–18 carbons, and R" is a divalent alkyl radical having 1–19 carbons. There are thus provided polymers of the general structure

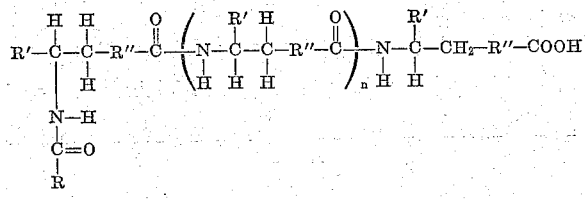

where R" is a divalent alkyl radical having 1–19 carbons and $n=4-100$. Also polymers of this structure having the nitrogen substituted on the carbon adjacent to that shown above are prepared.

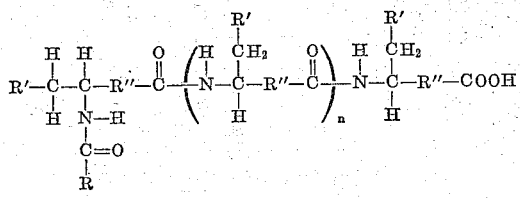

These materials are tacky dark-colored plastics having adhesive properties. The products find use as hot melts for sealing tin can seams. Also some of the polymers prepared by the method of the invention perform well in fiber and film applications. Unlike most polyamide polymers, these products are resistant to attack by alkali and are unaffected even by refluxing the polymer in strong aqueous or alcoholic sodium hydroxide or potassium hydroxide.

Broadly, the invention comprises heating and polymerizing N-acylamido fatty acids in an atmosphere substantially free of oxygen until a dark-colored tacky resin is formed. Although the reaction takes place at temperatures as low as about 150° C., an extended reaction time is required at this low temperature, and therefore the preferred reaction temperatures are in the range about 225–275° C. While higher temperatures up to around 300° C. and higher may be employed, excessive heating is usually avoided because of the danger of pyrolysis or crosslinking of the monomer. The time and temperature of heating are variable since some condensations with certain nitrile substituents and certain acyl groups may proceed rapidly, i.e., less than 2 hours, while others may require heating for as long as 24 hours at the temperature mentioned to obtain the molecular size desired. As the reaction proceeds, the condensation involving removal of the acyl group results in the distillation of the acid made up of this acyl group. Removal of the acid is facilitated by use of a vacuum or by sparging with an inert gas such as nitrogen, carbon dioxide, or other oxygen-free nonreactive gases. Sparging with steam is also an effective means for removing the acid and contaminating fatty acids which might otherwise act as chain stoppers in the polymerization.

The polymerizable monomer employed in preparing the unique resin is selected from N-acylamido fatty acids which are prepared by condensing a phenyl, cycloaliphatic or alkyl nitrile with a fatty acid in the presence of an acid catalyst. The method of preparation of these materials is known and is reported by Swern et al., Jour. Am. Chem. Soc. 75, 5479–5481 (1953), and Swern et al., Jour. Am. Chem. Soc. 77, 5408–5410 (1955).

A wide variety of N-acylamido fatty acids and mixtures of such compositions are available as the monomeric component. The acyl radical may be selected from any of a number of alkyl radicals, including the formyl or the single carbon radical through the 18-carbon acyl group represented by the N-stearyl radical. The N-acyl group should be free of chain unsaturation and, for this reason, it is recommended that an alkyl nitrile be employed in preparing the monomer. Homocyclic, cycloaliphatic, aromatic, and alkylaryl nitriles such as cyclohexyl nitrile, benzonitrile, benzyl nitrile, and other alkyl benzyl nitriles, may also be employed in providing the N-acyl group so long as unsaturation other than benzenoid unsaturation is not present.

The fatty acyl portion of the monomer molecule should be mono-unsaturated to permit addition of the nitrogen to the double bond. Monoethenoid monocarboxylic acids ranging from 4 carbon acids through selacholeic acid are suitable as the fatty acid portion of the molecule. Typical acids coming within this group are vinylacetic, undecylenic, lauroleic, myristoleic, palmitoleic, oleic, gadoleic, and erucic acids. All $C_4$–$C_{22}$ monoethenoic monocarboxylic acids free of alpha carbonyl unsaturation may be employed. Both the cis and trans forms of these acids may be used in preparing the monomer. Also it is possible where desired to cause a shift in the position of the unsaturation in the fatty chain by isomerization of naturally occurring monoethenoic acids and thus very the length of side chains in the polymer.

The production of polymers by the method of this invention is most unexpected since the monomers contain no unsaturation such as would be required for vinyl or addition-type polymerization. Moreover the monomers are not bifunctional which would normally be considered a prerequisite for obtaining condensation polymerization by use of heat. Additionally the monomers contain blocked amino groups precluding possible polyfunctionality.

In the structural formulae set forth in this specification and claims, the position of the acylamido group may be located alternatively on the ethenoid carbon of the fatty acid closest to the carboxyl group and also on the ethenoid carbon furthest from the carboxyl group. This results from the fact that when the nitrile is reacted with the mono-unsaturated fatty acid, mixtures containing both compositions are formed. Thus mixtures containing polymers having N-acyl substituents on each of the carbons are provided.

The following examples which are given by way of illustration, and not by way of limitation, show specific embodiments of the invention.

*Example I*

A charge of 1,500 grams of crude acetamidostearic acid prepared from oleic acid, acetonitrile, and sulfuric acid was subjected to steam-stripping at a temperature of 230–270° C. and 1 mm. pressure for 6 hours. During this period a substantial amount of contaminating fatty acids and acetic acid was removed. The residue (1,050 grams) was a brown, tacky, thermoplastic resin which proved to be an excellent adhesive for sealing seams on tin cans. Also, the resin could be formed into fibers. Analysis of this thermoplastic resin product follows:

| | |
|---|---|
| Percent nitrogen (Kjeldahl) | 4.4 |
| Molecular weight—weight average | 9,600 |
| (Ultracentrifuge)—Z average | 30,000 |
| Equivalent weight | 5,800 |
| Viscosity seconds | 61 |
| Color Index | 34 |

The equivalent weight in this and the examples which follow was determined by titrating a solution of the polymer in benzene and alcohol with 0.1 N sodium hydroxide to a phenolphthalein end point.

Relative molecular sizes of the various resins were measured by viscosity determinations. Viscosities were determined by dissolving 5 grams of the resin in tetrahydrofuran, filtering, and diluting to 100 ml. with tetrahydrofuran. The measurements were made at 30° C. using an Ostwald Viscometer size 100. A blank determination involving the use of tetrahydrofuran with no resin added shows a reading of 35 seconds.

Color was determined quantitatively by measuring optical density at 540 mu using a Bausch & Lomb Spectronic (20). An almost linear relationship was observed between optical density and concentration in tetrahydrofuran. The color index is defined as $$\frac{\text{Optical density} \times 100}{\text{Concentration}}$$

Also, the infrared spectrum of the resin prepared in Example I showed major peaks at 3.1, 6.1, 6.5, and 6.85 microns. These peaks are characteristic of amide linkages.

*Example II*

A sample of 1,328 grams of crude acetamidostearic acid was placed in a reaction vessel equipped with a distillation apparatus, and the charge was heated for 4 hours at 250° C. at a pressure of 1 mm. to provide 820 grams of a tacky, brown resin. During the course of the polymerization reaction 200 grams of distilled fatty acid was recovered. Viscosity and color of the polymer are:

| | |
|---|---|
| Viscosity seconds | 64 |
| Color Index | 47 |

*Example III*

A purified sample of acetamidostearic acid was heated in an atmosphere of carbon dioxide for 5 hours at 250° C. The starting acetamidostearic acid was a yellow oil. The resulting hard, tacky resin was light amber in color and exhibited the following viscosity and color characteristics:

| | |
|---|---|
| Viscosity seconds | 71 |
| Color Index | 10 |

*Example IV*

A crystalline sample of purified acetamidostearic acid (melting point 68–90° C.) was steam-stripped for 6 hours at 250° C. and 1 mm. pressure. The light amber resin which resulted had the following characteristics:

| | |
|---|---|
| Viscosity seconds | 62.5 |
| Color Index | 14 |

*Example V*

Formamidostearic acid prepared from red oil, liquid hydrogen cyanide, and sulfuric acid was heated under vacuum for 6 hours at 250° C. A soft, dark-colored resin was recovered. The resin had the following characteristics:

| | |
|---|---|
| Viscosity seconds | 47 |
| Color Index | 80 |

*Example VI*

The sulfuric acid catalyzed reaction between acetonitrile and 10-undecenoic acid resulted in the production of 10-acetamidoundecanoic acid. The product after recrystallization from acetone was a white crystalline material having a melting point of 57–58° C. Heating this monomer for 6 hours at 250° C. under vacuum resulted in the production of an orange, brittle resin which could be drawn into fibers. The molecular weight determinations resulted in the following:

| | |
|---|---|
| Weight average | $4.96 \times 10^3$ |
| Z average | $21 \times 10^3$ |

*Example VII*

Succinamidostearic acid prepared from succinonitrile, red oil, and sulfuric acid after crystallization from acetone is a very low melting light-green solid. After heating for 6 hours at 250° C. and 1 mm. pressure an amber, tacky resin resulted.

*Example VIII*

The following resins were prepared in the manner of Example VII.

| Monomer | Reaction Conditions | | Reaction Time, hrs. | Product |
|---|---|---|---|---|
| | Temperature, °C. | Pressure, mm. | | |
| Butyramidostearic acid | 250–300 | 0.5–2 | 4–6 | Tacky resin. |
| Capramidostearic acid | 275 | 0.5–2 | 4–6 | Thermoplastic resin. |
| Tridecylamidostearic acid | 275 | 0.5–2 | 4–6 | Do. |
| Acetamidobutanoic acid | 275 | 0.5–2 | 6 | Do. |

The pressures employed in the polymerizations are the minimum attainable with available vacuumizing equipment. Usually pressures in the range 0.5–2 mm. absolute are produced initially, but as the reaction proceeds some noncondensible gases are evolved resulting in fluctuations in pressure. After heating for a time sufficient to drive off all noncondensible gases, the pressure returns to 0.5–2 mm.

Obviously many modifications and variations of the invention as hereinbefore set forth may be made without departing from the spirit and scope thereof, and therefore only such limitations should be imposed as are indicated in the appended claims.

We claim:

1. A method of forming polyamide condensation polymers, which comprises: heating an isomeric mixture of an N-acylamino fatty acid having the structures

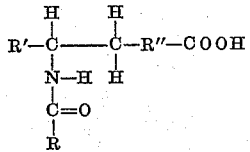

and

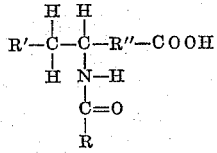

wherein R is an organic radical free of chain unsaturation, R' is the same in both formulas and is selected from the group consisting of hydrogen and alkyl radicals having 1–18 carbons, and R'' is the same in both formulas and is an alkylene radical having 1–19 carbons, to a temperature of up to about 300° C.

2. The product produced by the process of claim 1.
3. The product produced by the process of claim 1, wherein the acylamido fatty acid is acylamido stearic acid.
4. The product produced by the process of claim 1, wherein the acylamido fatty acid is acylamido butanoic acid.
5. The product produced by the process of claim 1, wherein the acylamide fatty acid is acylamidoundecanoic acid.
6. The process of claim 1, wherein the N-acylamido fatty acid is N-acylamido stearic acid.
7. A method of forming polyamide condensation polymers, which comprises: heating an isomeric mixture of an N-acylamido fatty acid under substantially non-oxidizing conditions to a temperature of about 150–300° C., said mixture being the isomers of an acid having the structures

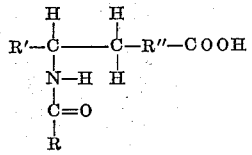

and

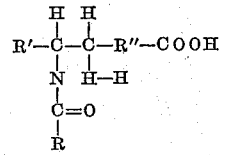

wherein R is an organic radical free of chain unsaturation, R' is the same in both formulas and is selected from the group consisting of hydrogen and alkyl radicals having 1–18 carbons, and R'' is the same in both formulas and is an alkylene radical having 1–19 carbons, to a temperature of up to about 300° C.

References Cited in the file of this patent

UNITED STATES PATENTS

| | | |
|---|---|---|
| 2,071,253 | Carothers | Feb. 16, 1939 |
| 2,277,125 | Martin | Mar. 24, 1942 |
| 2,277,152 | Schlack | Mar. 24, 1942 |
| 2,343,769 | Gray | Mar. 7, 1944 |
| 2,573,673 | Ritter | Oct. 30, 1951 |
| 2,701,809 | Plaut | Feb. 8, 1955 |
| 2,705,705 | Chirtel et al. | Apr. 5, 1955 |

FOREIGN PATENTS

| | | |
|---|---|---|
| 881,898 | France | May 11, 1943 |